United States Patent [19]

Hale et al.

[11] Patent Number: 5,248,665
[45] Date of Patent: Sep. 28, 1993

[54] DRILLING FLUIDS COMPRISING POLYCYCLIC POLYETHER POLYOL

[75] Inventors: Arthur H. Hale; George C. Blytas; Ashok K. R. Dewan, all of Houston, Tex.

[73] Assignee: Shell Oil Company, Houston, Tex.

[21] Appl. No.: 757,383

[22] Filed: Sep. 10, 1991

Related U.S. Application Data

[60] Division of Ser. No. 671,630, Mar. 19, 1991, Pat. No. 5,083,622, which is a continuation-in-part of Ser. No. 503,489, Mar. 30, 1990, abandoned, which is a continuation-in-part of Ser. No. 382,071, Jul. 17, 1989, abandoned, which is a division of Ser. No. 167,767, Mar. 14, 1988, abandoned, and a continuation-in-part of Ser. No. 373,606, Jun. 30, 1989, abandoned, which is a division of Ser. No. 167,660, Mar. 14, 1988, abandoned, and a continuation-in-part of Ser. No. 353,195, May 12, 1989, abandoned, which is a division of Ser. No. 167,769, Mar. 14, 1988, abandoned.

[51] Int. Cl.$^5$ .............................................. C09K 7/02
[52] U.S. Cl. ...................................... 507/136; 507/139
[58] Field of Search ................ 252/8.51, 8.513, 8.514; 507/136, 139

[56] References Cited

U.S. PATENT DOCUMENTS 2,191,312  2/1940  Cannon ............................ 252/8.5
4,780,220  10/1988  Peterson ......................... 252/8.514

Primary Examiner—Gary Geist

[57] ABSTRACT

Drilling fluid properties are enhanced by incorporation thereinto of a cyclicetherpolyol such as a cyclic dimer of glycerol and, optionally, a polyol such as glycerol or a monoalicyclicpolyol, and/or salt.

3 Claims, 1 Drawing Sheet

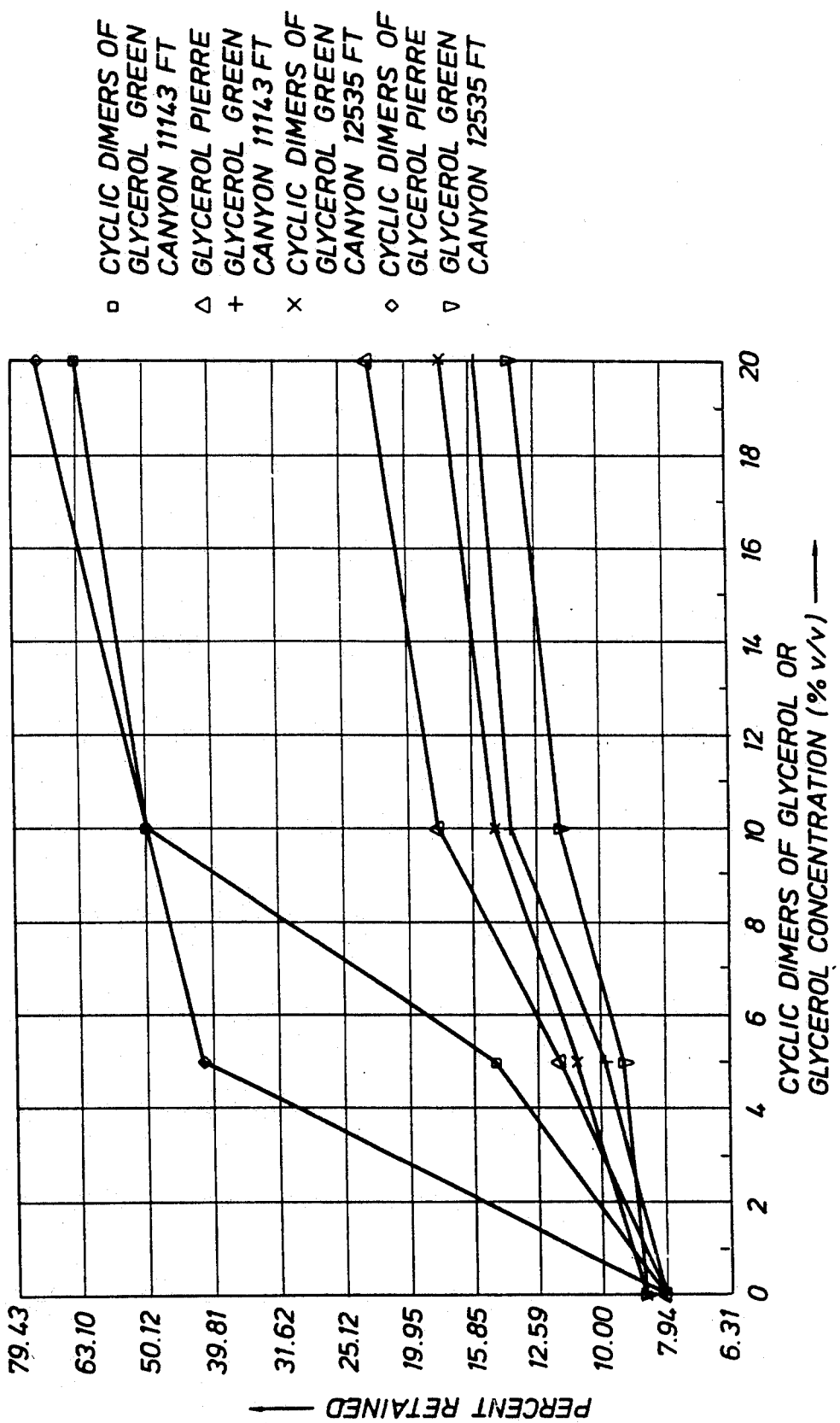

DRILLING FLUIDS COMPRISING POLYCYCLIC POLYETHER POLYOL

This is a division of application Ser. No. 07/671,630, filed Mar. 19, 1991, now U.S. Pat. No. 5,083,622 which is a continuation-in-part of application Ser. No. 07/503,489, filed Mar. 30, 1990, abandoned, which is a continuation-in-part of application Ser. No. 07/382,071, filed Jul. 17, 1989, abandoned, which is a division of application Ser. No. 07/167,767, filed Mar. 14, 1988, abandoned, and a continuation-in-part of application Ser. No. 07/373,606, filed Jun. 30, 1989, abandoned, which is a division of application Ser. No. 07/167,660, filed Mar. 14, 1988, abandoned, and a continuation-in-part of application Ser. No. 07/353,195, filed May 12, 1989, abandoned, which is a division of application Ser. No. 07/167,769, filed Mar. 14, 1988, abandoned.

BACKGROUND OF THE INVENTION

This invention relates to water base drilling fluids. More particularly, the invention relates to water base drilling fluids having improved characteristics which allow low temperature drilling operations, inhibit formation of gas hydrates which form at low temperatures and high pressures, prevent shale dispersion which results in improved wellbore stability, reduce fluid loss, and are environmentally safe.

Water base drilling fluids (or muds) generally comprise water, clays or polymers, and various treating agents which control the physical, chemical and/or rheological properties of drilling fluids in wellbores. The drilling fluid serves to remove chips, cuttings and the like produced by a rotating drill bit from a wellbore by circulating the drilling fluid down from the surface of the well, through the drill string, and out through openings in the drill bit such that the drilling fluid is then circulated upwardly in the annulus between the side of the wellbore and the rotating drill string.

The selection of a drilling fluid is primarily dependent upon the geological formation being drilled and the problems associated with such formation. Principal concerns in selection of a drilling fluid are low temperature drilling conditions, formation of gas hydrates, shale dispersion, and drilling fluid loss and environmental requirements. Classically, temperature concerns associated with drilling oil/gas wells have been associated with deep hot wells (>300° F.); however, for deep water and/or Arctic drilling, low temperatures are a concern for two principal reasons: (1) freezing of the mud due to low temperature, especially if the well must be shut in for long durations, and (2) the formation of as hydrates under low temperature and high pressure conditions after the influx of gas. The present invention provides a drilling fluid additive which overcomes these and other problems in the art as more particularly disclosed hereinafter.

SUMMARY OF THE INVENTION

The primary purpose of the present invention is to provide a drilling fluid, and process for the use thereof, which drilling fluid contains additives which depress the freezing point of the fluid to allow low temperature drilling operations, inhibit formation of gas hydrates which form at low temperatures and high pressures, prevent shale dispersion which results in improved wellbore stability, reduce drilling fluid loss thereby reducing amounts of other fluid loss additives if any (e.g. gel-bentonite, carboxymethylcellulose, starch), and are environmentally safe. Accordingly, the present invention is directed to a water base drilling fluid comprising water, clay or polymer, and a sufficient amount oat least one cyclicetherpolyol such as a polycyclicpolyetherpolyol or a cyclic dimer of glycerol and, optionally, an acyclic polyol such as glycerol or a monoalicyclicpolyol, and/or a salt, necessary to reduce the freezing point of the drilling fluid to a predetermined value, inhibit the formation of gas hydrates in the drilling fluid, prevent shale dispersion from the wellbore into the drilling fluid, and reduce fluid loss through the wall of the wellbore thereby reducing amounts of other fluid loss additives if any (e.g. gel-bentonite, carboxymethylcellulose, starch).

In addition, the present invention is directed to a method for drilling a well comprising rotating a drill string to cut a borehole into the earth; circulating a drilling mud, through the drill string and through the annulus between the drill string and the wall of the borehole; checking the drilling fluid for evidence of any of the following problems: freezing, gas hydrate formation, shale dispersion and fluid loss; and adding a cyclicetherpolyol such as polycyclicpolyetherpolyol or cyclic dimers of glycerol and, optionally, an acyclic-polyol such as glycerol or a monoalicyclicpolyol, and/or a salt, to the drilling fluid in an amount sufficient to overcome the above identified problems. Further, the present invention provides a method for drilling a well comprising determining whether the formation to be drilled will subject the drilling fluid to any of the following problems: freezing, gas hydrate formation, shale dispersion, and fluid loss; providing a drilling fluid containing a cyclicetherpolyol such as a polycyclicpolyetherpolyol or cyclic dimers of glycerol and, optionally, an acyclicpolyol such as glycerol or a monoalicyclic polyol, and/or a salt, in an amount sufficient to overcome the above identified problems; rotating a drill bit to cut a borehole into the earth; and circulating the drilling fluid through a drill string and through an annulus between the drill string and the wall of the borehole.

Other purposes, distinctions over the art, advantages and features of the invention will be apparent to one skilled in the art upon review of the following.

BRIEF DESCRIPTION OF THE DRAWINGS

FIG. 1 discloses inhibition of cuttings dispersion.

DESCRIPTION OF PREFERRED EMBODIMENTS

Applicants have found that the use of a cyclicetherpolyol such as polycyclicpolyetherpolyol or cyclic dimers of glycerol and, optionally, an acyclicpolyol such as glycerol or a monoalicyclicpolyol and/or a salt, in an appropriate amount, in a drilling fluid substantially depresses the freeing point of the drilling fluid to eliminate problems with low temperature drilling operations, inhibits formation of gas hydrates which form at low temperatures and high pressures, prevents shale dispersion which results in improved wellbore stability, reduces drilling fluid loss thereby reducing amounts of other fluid loss additives if any (e.g. gel-bentonite, carboxymethylcellulose, starch), and is environmentally safe. Thus, according to the Applicants' method, the drill string is rotated to cut a borehole into the earth while circulating a drilling fluid down through the drill string and thence up the annulus between the drill string and the wall of the borehole. While this is occurring, a driller preferably is checking or observing the drilling fluid for evidence of the above noted problems. Alternatively, the formation may be known in advance to present certain problems, and the drilling fluid may be provided with the cyclicetherpolyol such as polycyclicpolyetherpolyol or cyclic dimers of glycerol and, optionally, the acyclic polyol such as glycerol or the monoalicyclicpolyol, and/or a salt, in amounts sufficient to overcome these problems.

In most instances, the applicable amount of additive to be added to the drilling fluid will be determined on a well-to-well basis. A concentration of cyclicetherpolyol (e.g. cyclic dimers of glycerol) in the drilling fluid of from about 1 to 60, or preferably about 5 to 50 percent by weight and, optionally, acyclicpolyol or monoalicyclicpolyol (e.g. glycerol) of from about 1 to 60, or preferably about 5 to 35 percent by weight and/or a salt of from about 1 to 26, or preferably about 5 to 20 percent by weight, based on the total weight of the drilling fluid, will reduce the freezing point of the drilling fluid. A concentration of from about 1 to 60, or preferably about 5 to 50 percent by weight cyclicetherpolyol (e.g. cyclic dimers of glycerol) and, optionally, acyclicpolyol or monoalicyclic polyol (e.g. glycerol) of from about 1 to 60, or preferably about 5 to 35 percent by weight and/or from about 1 to 26, or preferably about 5 to 20 percent by weight salt, based on the total weight of the drilling fluid, will inhibit formation of gas hydrates. A concentration of from about 1 to 40, or preferably about 5 to 20 weight percent cyclicetherpolyol (e.g. cyclic dimers of glycerol) and, optionally, acyclicpolyol or monoalicyclicpolyol (e.g. glycerol) of from about 1 to 40, or preferably about 5 to weight percent and/or from about 1 to 26, or preferably about 5 to 20 percent by weight salt in the drilling fluid, based on the total weight of the drilling fluid, will prevent shale dispersion. A concentration of from about 1 to 40, or preferably about 2 to 15 weight percent cyclicetherpolyol (e.g. cyclic dimers of glycerol) in the drilling fluid and, optionally, acyclicpolyol or monoalicyclicpolyol (e.g. glycerol) of from about 1 to 60, or preferably about 5 to 30 percent by weight and/or salt of from about 1 to 26, or preferably about 2.5 to 15 weight percent, based on the total weight of the drilling fluid, will reduce fluid loss from the drilling fluid through the wall of the wellbore.

Various inorganic salts are suitable for use with the invention, including but not limited to NaCl, NaBr, KCl, $CaCl_2$ and $NaNO_3$, among which NaCl is preferred. A synergistic effect is experienced when such a salt is used with cyclic dimers of glycerol as a mud additive package, i.e. an effect greater than the sum of the effects from salt and cyclicetherpolyol (e.g. cyclic dimers of glycerol) individually. This will be even more apparent from the examples hereinafter.

The cyclicetherpolyol of this invention in its less complex structures can have less tan 8 hydroxyl groups and less than 16 carbon atoms, e.g., a cyclic telomer of glycerol. "Poly" herein is used to mean 2 or more, "mono" is used to mean one, "cyclic" is used to mean one or more rings, "ether" is used to mean one or more ether linkages, PECP will mean either of polyetherpolycyclicpolyol, or polycyclicpolyetherpolyol. Preferred cyclicetherpolyols are those having at least 6 carbon atoms, at least 2 hydroxyl groups, and at least 2 ether linkages, but no more than 1800 carbon atoms, 450 hydroxyl groups, and 600 ether linkages. Even more preferred are cyclicetherpolyols having at least 15 carbon atoms, 5 ether linkages, and at least 5 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages but preferably no more than 1200 carbon atoms, 300 hydroxyl groups, and 400 ether linkages. Weight average molecular weights [defined infra] for the cyclicetherpolyols preferably range from 1,000 to 30,000 and more preferably from 5,000 to 20,000. Among the cyclicetherpolyols, monocyclicdietherdiols are preferred and polycyclicpolyetherpolyols are more preferred.

Preferred alcohols which can be used with cyclicetherpolyols include acyclic polyols and monoalicylicpolyols. Among acyclic polyols, preferred are those having at least 3 carbon atoms and 2 hydroxyl groups but no more than 80 carbon atoms and 60 hydroxyl groups. More preferably, the acyclic polyols of the invention have at least 9 carbon atoms and 5 hydroxyl groups but no more than 50 carbon atoms and 40 hydroxyl groups. Among monoalicylicpolyols, preferred are those having 5 to 30 carbon atoms and 2 to 10 hydroxyl groups.

Nonlimiting examples of polyols and starting materials for preparing cyclicetherpolyols include monomers, oligomers and telomers of polyhydric alcohols (or their precursors, or combinations thereof) such as glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, 1,5,6,9-decanetetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol, and copolymers of ethylene glycol and propylene glycols with the preceding alcohols.

The effectiveness of adding a commercially available polyol mixture (herein referred to as POLS) or polyetherpolycyclicpolyols prepared by Shell Chemical Company (herein referred to as PECP) are shown for different drilling fluid combinations hereinafter. The POLS sample tested herein was analyzed to be 46.8% w propylene glycol with 16.6% w linear dimers, 17.5% w linear trimers, 3.8% w linear tetramers, 3.2% w linear pentamers, and 0.88% w linear hexamers of propylene glycol, with less than 0.5% w cyclics, 11% w water and 0.2 to 0.5% w Na+ and K+. A typical PECP sample tested was 0.16% w glycerol, 11.4% w p-dioxanes, 1.1% w cyclic trimers of glycerol, 4% w cyclic and dicyclic tetramers of glycerol, 2 % w cylclic and dicyclic pentamers of glycerol, 2% w dicyclic and tricyclic hexamers of glycerol, 2% w dicyclic and tricyclic heptamers of glycerol, 3% w dicyclic and tricyclic octamers of glycerol, 4% w dicyclic and tricyclic nonamers of glycerol, 27% w polycyclicpolyetherpolyols having at least 30 carbon atoms and at least 2 cyclic ethers per molecule, 37.5% w water, and 0.5% NaCl.

Cyclicetherpolyols can be obtained, for example, by extraction from saline water byproduct streams arising from the manufacture of epoxy resins, e.g., by reaction of epichlorohydrin and bisphenol A as described in U.S. Pat. Nos. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic diethers, the number of moles of water expelled must be at least equal to the number of moles of glycerol (or other polyhydric, at least trihydric, polyol) used in the reaction mixture.

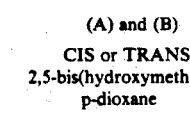 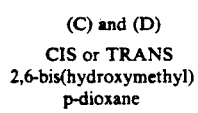 (I)

(A) and (B)
CIS or TRANS
2,5-bis(hydroxymethyl)
p-dioxane (C) and (D)
CIS or TRANS
2,6-bis(hydroxymethyl)
p-dioxane

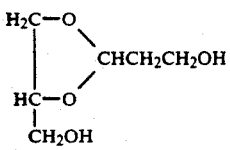

(E)
Glycerine Acetal of
Hydracrylaldehyde

In structures A through D, CIS and TIL-VIS refer to the stereoisomerism of the carbon atoms marked by an asterisk. Structures A through D can also be referred to as bis-hydroxymethyl 1,4-p-dioxanes, monocyclicdietherdiols or cyclic dimers of glycerol.

Polycyclicpolyetherpolyols may in turn be prepared by polycondensation of compounds such as (A) through (E) supra in chemical processes which are accompanied by significant expulsion of water molecules from the polymerizing compounds. The number of ether linkages equals the number of water molecules expelled. Taking (C) or (D) supra as the building unit, the lowest molecular weight structure containing two such units is Structure (II) infra, containing two terminal hydroxyl groups, and five ether linkages. Structure (II) is formed by condensation from glycerol molecules with the expulsion of five water molecules.

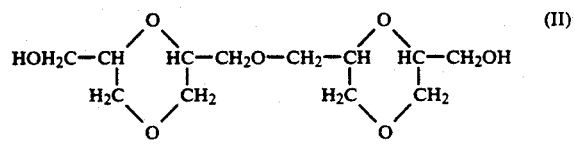 (II)

This structure is a di-cyclicpoly (or penta) etherdiol, and can be called di-bis-hydroxymethyl 1,4-p-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

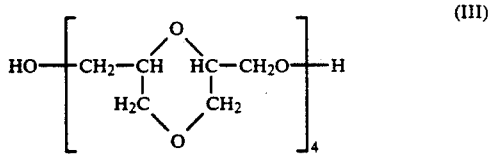 (III)

Copolycondensation of four structure (I) units with itself and with one polyhydric (at least trihydric) molecule, e.g., a glycerol molecule, can yield structure (IV) infra and its isomeric equivalents:

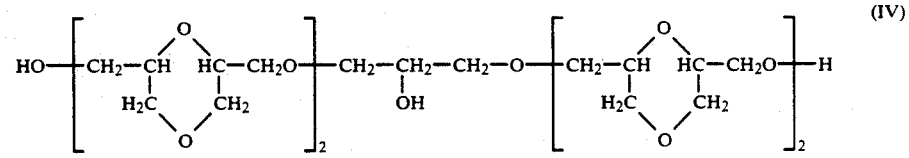 (IV)

Analogous structures can be obtained from structures (I) (A), (I) B, and (I) E supra by polycondensation. Structures based on (E) supra will have 5-membered rings. Spectroscopic techniques cannot conveniently distinguish between the 5 or 6 membered rings.

Structure (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units or other polyhydric (at least trihydric) units, occur randomly in the structure. Disregarding the order of occurrence, a general chemical composition formula representative of all of these structures is:

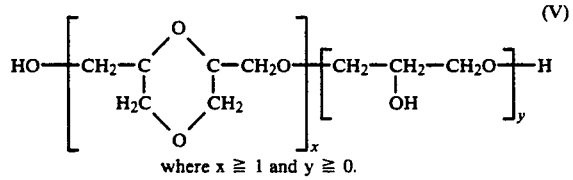

where $x \geq 1$ and $y \geq 0$.

Preparation of cyclicetherpolyols for the practice of this invention can be obtained by direct synthetic route. For example, starting with glycerol, chlorohydrin can be produced, which upon treatment with NAOH at elevated temperatures yields glycidol. This molecular structure cyclicizes at still higher temperature to yield bis hydroxymethyl 1,4-p-dioxane.

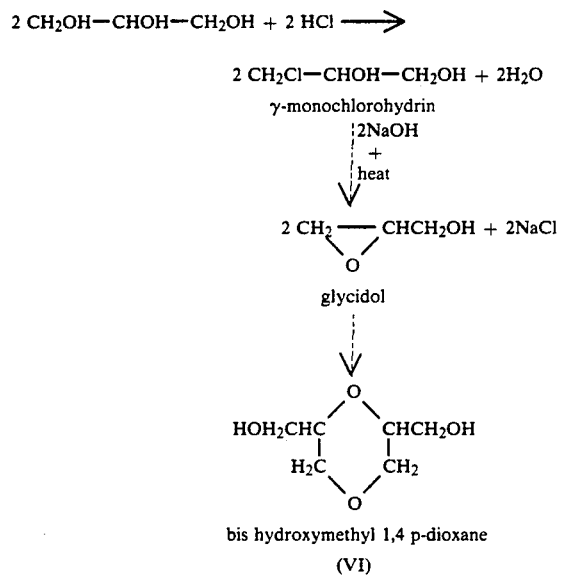

To make the higher molecular weight components from bis hydroxymethyl-1,4 p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range from 150° C. to 350° C. can be employed with pressures ranging from subatmospheric to several atmospheres. The vapor pressure of he water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which can enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols are quite suitable. Examples are butane triols, such as 1,2,4 butanetriol, pentane triols, such as 1,2,3 pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

will yield several structures, one of which is illustrated by:

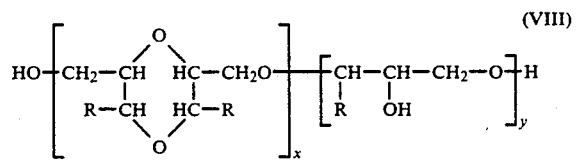

The R group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols can be obtained from trihydric alcohols with more than three carbons such as the following:

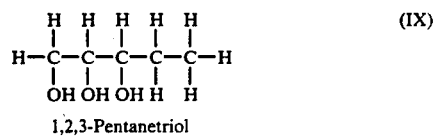

1,2,3-Pentanetriol

The following monocyclicdietherdiols of pentanetriol are obtained from Structure IX in accordance with the methods described supra:

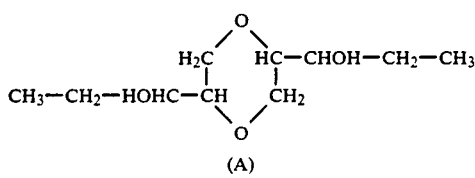

(A)

-continued

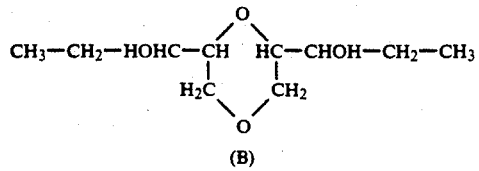

(B)

Both dimers (A) and (B) are obtained from Structure IX by reacting at carbons 1 and 2.

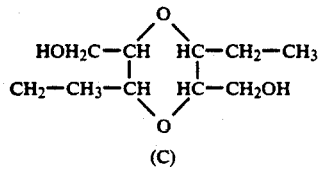

(C)

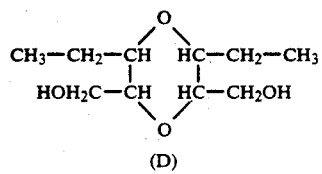

(D)

Both dimers (C) and (D) are obtained by reacting Structure (IX) at carbons 2 and 3.

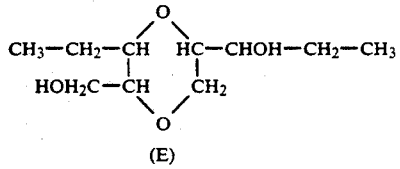

(E)

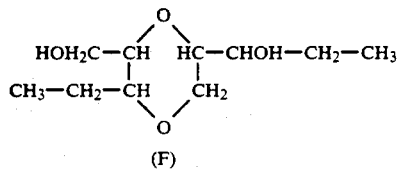

(F)

Dimers (E) and (F) are obtained from (IX) by reacting at 1,2 and at 2,3 positions.

(X)

Further polycondensation of the cyclicetherdiols supra will yield polycyclicpolyetherplyols with structures which depend on which hydroxyl groups are involved in the condensation reaction. For instance, reaction between Structures (X) A supra and (X) F supra will yield (XI) infra, a dicyclicpentaetherdiol of pentanetriol as follows. Obviously, a large number of possible polycondensed structures exist.

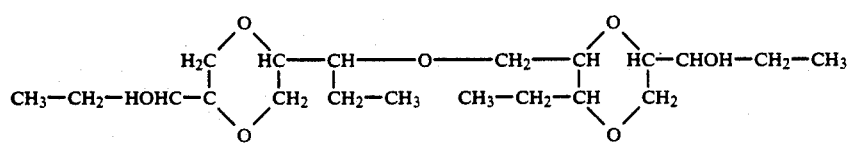

Two examples of polyglycerol structures which can undergo cyclization are molecules XII and XIII below:

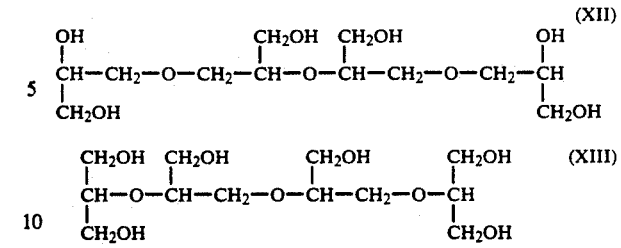

The general formula of the cyclized polyglycerols is poorer in oxygen and hydrogen than the general composition $C_{3x} O_{2x+1} H_{6x+2}$. Cyclization of XII yields XIV, and cyclization of XII yields XIII.

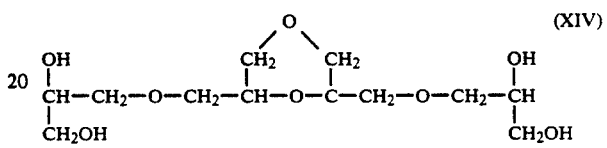

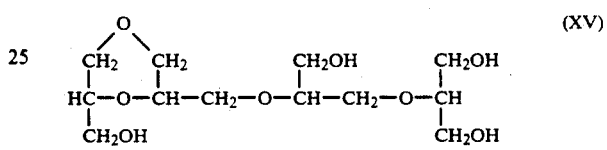

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture.

The weight average molecular weight was found to be:

$$M_w = \frac{\sum_i n_i M_i^2}{\sum_i n_i M_i} \geq 10550$$

This molecular weight, weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample on those properties which depend on the size of the individual molecules, such as effectiveness in light scattering, or ability of the molecule to penetrate into small openings. Thus, a high $M_w$ would be beneficial if penetration of the molecules into the interplanar structure of layered clays in the formulation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP.

Most preferred samples of polycyclicpolyetherpolyols with beneficial effects on the properties of drilling fluids have been found to have $M_n$ values in the order of about 150 to about 2000 and $M_w$ values in the order of 1500 to 12000. The $M_n$ and $M_w$ values for POLS are 130-145 and 700-875, respectively, but POLS is superior to many other alcohols in carrying out the purposes of this invention.

Structural determination of mixtures using Mass Spectroscopy has yielded x values (see structures V and VIII supra) of 1 to 4 in portions of the sample not exceeding 14 glycerol units, thus indicating that in a significant portion of the sample $x \geq y/2$, although the invention is not limited to this theory. This procedure is limited with regard to the molecular weight of structures that it can determine, to molecules with about 50 carbon atoms.

In accordance with a highly preferred embodiment of the invention, polycyclicpolyetherpolyols having superior characteristics are produced by thermal condensation of glycerol in distillation apparatus under conditions which allow water to be removed overhead, but not substantial amounts of glycerol or its dimers or trimers. A catalyst is required, preferably an alkali metal hydroxide, more preferably sodium hydroxide, in a preferred concentration of 0.5-1.5 percent by weight of the reaction mixture, and preferably including an alkali metal acetate, more preferably sodium acetate, in like or smaller amounts.

The mixture is heated, preferably between 150 and 350 mm Hg and free water is distilled off continuously, allowing the equilibrium limited reaction to proceed further and to completion. The glycerol will then begin to rise in temperature to about 210°-230° C. at 120-180 mm Hg, at which temperature the mixture refluxes, indicating the onset of reactions which produce water by condensation of the glycerol. By maintaining the pressure at up to 180 mm Hg, the glycerol, which may volatilize along with the water, is condensed in an overhead condensor, and preferably cooled by a coolant. The glycerol and its linear and cyclic dimers which form in the course of the volatilization process, are condensed and refluxed to the reacting mixture. Gradually the procedure results in an increase in the boiling point of the mixture, brought about by the continuous removal of water of condensation and by the increase of the molecular weight of the mixture.

As the degree of polymerization increases, and the water removed from the glycerol feed increases, the pressure over the mixture is gradually decreased externally, either in a continuous, preferably gradual mode, or at selected reaction temperatures. For example, it is possible to reduce the pressure to 120 mm Hg when the mixture reaches 250° C. at a pressure of 180 mm Hg. Alternatively, it is possible to control the pressure to diminish gradually by a known mechanical means.

The preferred way to achieve extensive dehydration without undesirable crosslinking and gelation of the polycyclicpolyetherpolyols is by the addition of small amounts of glycerol, at a later stage of the reaction, for example, when the reaction medium temperature has reached 270°-280° C. at a pressure of 50-100 mm Hg, preferably 60-90 mm Hg. Upon addition of 2-6 percent by weight of glyercol, basis final weight of glycerol added, at a point after removal, for example, of 0.8 moles of water per mole of glycerol, a drop in the temperature of the reaction mixture occurs, the drop being several degrees Centigrade or Fahrenheit. The drop is caused by the lower temperature of the glycerol being added, but more importantly indicates the endothermic nature of the reaction between glycerol molecules, or between glycerol molecules and added glycerol molecules, or between added glycerol molecules with reactive sites in the polymerizing mixture. For better effectiveness, the glycerol may be presaturated with alkaline metal hydroxide, e.g., sodium hydroxide.

Upon continued input of heat from an external source, the temperature of the reacting mixture rises to the previous highest level, or to a higher level, or to a somewhat lower level than a first high temperature, depending upon the molecular weight distribution of polycyclicpolyetherpolyols in the mixture. This procedure of incremental glycerol addition can be repeated a number of times, three being a convenient number. With three additions of glycerol the experimental reaction time between onset of reaction and its completion usually takes 5-10 hours depending on the temperature and pressure of additions and the amount of glycerol added each time. As the reaction approaches 85 percent completion it is suitable to combine glycerol additions with further reductions of pressure, going down to 30 mm Hg or even lower. As the reaction approaches completion, it turns from being highly endothermic to being thermally neutral, and at a dehydration approaching and exceeding 1.2 moles of water per mole of glycerol, it can become exothermic. This is a reflection of the propensity of the mixture to undergo rapid crosslinking of the complex polycyclicpolyetherpolyol structures. In order to avoid the occurrence of such an undesirable crosslinking reaction, it is preferred to buffer the reaction by adding a small amount of glycerol, for example, 0.3-0.9 percent or up to 1.5 percent by weight total. Preferably there is added 0.5 percent by weight of glycerol at a selected time or preferably at a point where the reaction is 96 percent complete, after removal of 1.12-1.15 moles of water per mole of glycerol in the reaction medium.

It has been found that the addition of minor amounts of epoxy resins to the reaction mixture are beneficial. Preferred epoxy resins are diglycidyl ethers, triglycidyl ethers, and tetraglycidyl ethers which, in the reacting glycerol medium, result in formation of higher molecular weight polycyclicpolyetherpolyols which substantially improve properties in connection with drilling fluid performance. Polycyclicpolyetherpolyols resulting from this process are characterized by binodal molecular weight distribution, $M_w$ in excess of 50,000, said $M_w$ being determined in a three-column gel permeation chromatography, and being 0.5 to 10% w epoxy structures. The polycyclicpolyetherpolyols are further characterized by molecular structures which are no more than 20% free of associated cyclic formations.

Experimental results show that the impact of using multifunctional glycidyl ethers on the value of $M_n$ and on the performance, particularly as regards swelling of clays when the invention is used as a drilling fluid additive, is truly significant. Thus, when using 3.0% w Epon 828 (difunctional) glycidyl ether and 3.0% w Epon 1031 (tetrafunctional glycidyl ether) tradenames of Shell Oil Company, the $M_w$ values are correspondingly 78,015 and 151,000, and the swelling inhibition is the highest with Epon 1031, with good performance on fluid loss and on dispersion. The immediately preceding $M_w$ values are expressed in terms of true molecular weight in units of Daltons by using three Ultrahydrogel columns, a Linear column, a 250 angstroms column and a 120 angstroms column in series, using water as the solvent at 30° C.

Drilling fluid properties should be such as to promote safe and speedy drilling and completion of the well with the maximum productive capacity. Use of drilling fluids of controlled properties requires expenditure of large sums of money, and to carry out its role properly, the drilling fluid must be protected against the effects of freezing conditions, gas hydrate formation, shale dispersion and fluid loss. The use of cyclicetherpolyols (e.g., cyclic dimers of glycerol) and, optionally acyclic polyols or monoalicyclicpolyols (e.g., glycerol) and/or a salt, readily protects the drilling fluid against freezing conditions and gas hydrate formation by lowering the freezing point of the drilling fluid. With respect to shale dispersion and fluid loss, the use of cyclicetherpolyols (e.g., cyclic dimers of glycerol) and, optionally, acylic polyols or monoalicyclicpolyols (e.g., glycerol) and/or a salt aids in deposition of an impermeable filter cake, and the filter cake in turn prevents fluid loss and shale dispersion. The filter cake performs its job primarily on the basis of its impermeability to water. If the formation permeability and the fluid-loss properties of the mud are both high, large quantities of fluid will flow through the wall cake and into the permeable formation, leaving a thick wall cake behind. This cake may become so thick as to seriously interfere with movement of the drill pipe when it is withdrawn and may even result in sticking the pipe. If a thick cake is formed over the face of the producing formation, it may not become properly cleaned off during the well completion process and will interfere with the production rate of the well. The fluid which passes into the formation may also exercise an influence. When the drilling fluid is water base and shales and clays, which are susceptible to hydration are drilled, the use of high fluid loss drilling fluid may result in swelling and heaving of the shale, slow drilling rates, stuck pipe, fishing jobs and even loss of the hole. If the producing formation contains hydratable clays, the intrusion of water may result in swelling of the clay particles within the sandy formation and permanent loss of permeability with resulting impaired production rates. Cyclicetherpolyols (e.g., cyclic dimers of glycerol) and, optionally, acyclic polyols or monoalicyclicpolyols (e.g., glycerol) and/or a salt, readily solve such problems by increasing the impermeability of the filter cake to water and thus decreasing the fluid-loss properties of the drilling fluid. In addition, cyclicetherpolyols (e.g., cyclic dimers of glycerol) and, optionally, acyclic polyols or monoalicyclic polyols (e.g., glycerol) and/or a salt, perform these functions without changing mud properties adversely.

The following examples are illustrative of the application of the process of the present invention and of the drilling fluid composition, and are not to be construed as limiting the scope thereof.

Table 1 demonstrates that cyclic dimers of glycerol inhibit cuttings dispersion of different shales. The novel result is that the cyclic dimers of glycerol were, on a percentage basis, more effective than glycerol. This was not expected. In FIG. 1 the improved inhibition of cuttings dispersion as a function of concentration of cyclic dimers of glycerol over glycerol is apparent.

In Table 2 the ability of cyclic dimers of glycerol to inhibit cuttings dispersion in the presence of sodium chloride is shown. Two experiments were done which indicate that both cyclic dimers of glycerol and NaCl inhibit dispersion. However, the inhibition of dispersion is greater when cyclic dimers of glycerol and NaCl are combined than would have been expected if these two reagents acted additively.

TABLE 1

EXPERIMENTS FOR INHIBITION OF CUTTINGS DISPERSION

Green Canyon 11143.5 (Gulf of Mexico)

| [1]CDG Concentration (%) | 0 | 5 | 10 | 20 | | | |
|---|---|---|---|---|---|---|---|
| Glycerol (%) | | | | | 5 | 10 | 20 |
| Time (seconds) | Percent Retained | | | | | | |
| 15 | 8 | 14.4 | 50 | 62.5 | 9.8 | 13.8 | 15.6 |
| 30 | 0.8 | 3.6 | 5.2 | 8.8 | 2.2 | 3.5 | 5.4 |
| Pierre Shale (Utah) | | | | | | | |
| Time (hours) | | | | | | | |
| 1 | 55.5 | 77.9 | 88.6 | 95.7 | 58.9 | 65.2 | 71.9 |
| 3 | 35.6 | 68.9 | 81.6 | 93.5 | 38.9 | 55.2 | 65.2 |
| 6 | 27.2 | 61.2 | 76.8 | 88.6 | 33.5 | 41.5 | 55.9 |
| 20 | 7.9 | 41.2 | 50.3 | 71.8 | 11.5 | 17.9 | 22.8 |
| Green Canyon Shale 12535 (Gulf of Mexico) | | | | | | | |
| Time (seconds) | | | | | | | |
| 15 | 26.5 | 31.4 | 35.8 | 39.9 | 27.4 | 31.1 | 35.2 |
| 30 | 8.6 | 10.8 | 14.7 | 17.4 | 9.2 | 11.5 | 13.4 |
| 45 | 2.2 | 4.5 | 6.8 | 10.3 | 3.2 | 4.4 | 7.8 |

[1]CDG refers collectively to the five previously mentioned cyclic dimers of glycerol and glycerol (v/v %). CDG samples were 90% cyclic dimers of glycerol/10% glycerol (v/v %).

Shale sized between 6–10 mesh was hot rolled in the test solution at 150° F. for the indicated amount of time. The shale/test solution suspension was then screened over 10, 30 and 80 mesh screen, dried and weighed. The data is expressed as percent retained of the original weight (2.5 gm).

TABLE 2

SYNERGY BETWEEN NaCl AND CYCLIC DIMERS OF GLYCEROL
Green Canyon[2] 12535 (Gulf of Mexico)

| | Experimental | Fresh Water or NaCl Average | Experimental Minus Fresh Water | Predicted[3] |
|---|---|---|---|---|
| | Percent Retained | | | |
| Experiment I | | | | |
| 0.15 M NaCl | 28.7 | 28.65 | 26.35 | |
| 0.15 M NaCl | 28.6 | | | |
| 20% CDG[1]/NaCl | 52.3 | | 50 | 34.9 |
| 10% CDG/NaCl | 45.6 | | 43.3 | 31.4 |
| 5% CDG/NaCl | 36.5 | | 34.2 | 28.2 |
| 2.5% CDG/NaCl | 31.2 | | 28.9 | 26.8 |
| Fresh Water | 2.4 | 2.3 | 0 | |
| Fresh Water | 2.2 | | | |
| 20% CDG/Fresh Water | 10.8 | | 8.5 | |
| 10% CDG/Fresh Water | 7.3 | | 5 | |

TABLE 2-continued

SYNERGY BETWEEN NaCl AND CYCLIC DIMERS OF GLYCEROL
Green Canyon[2] 12535 (Gulf of Mexico)

| | Experimental | Fresh Water or NaCl Average | Experimental Minus Fresh Water | Predicted[3] |
|---|---|---|---|---|
| | | Percent Retained | | |
| 5% CDG/Fresh Water | 4.2 | | 1.9 | |
| 2.5% CDG/Fresh Water | 2.8 | | 0.5 | |
| Experiment II | | | | |
| 0.306 M NaCl | 53.2 | 52.65 | 50.2 | |
| 0.306 M NaCl | 52.1 | | | |
| 20% CDG/NaCl | 73.2 | | 70.75 | 59.0 |
| 10% CDG/NaCl | 65.4 | | 62.95 | 55.0 |
| 5% CDG/NaCl | 62.1 | | 59.65 | 52.5 |
| 2.5% CDG/NaCl | 56.4 | | 53.95 | 50.8 |
| Fresh Water | 2.4 | 2.45 | 0 | |
| Fresh Water | 2.5 | | | |
| 20% CDG/Fresh Water | 11.2 | | 8.75 | |
| 10% CDG/Fresh Water | 7.2 | | 4.75 | |
| 5% CDG/Fresh Water | 4.7 | | 2.25 | |
| 2.5% CDG/Fresh Water | 3 | | 0.55 | |

[1]CDG refers collectively to the five previously mentioned cyclic dimers of glycerol in combination with glycerol. NaCl is the concentration shown for the salt fresh water solution. CDG is expressed percent by volume.
[2]Green Canyon shale sized between 6 and 10 mesh was hot rolled at 150° F. for 45 seconds.
[3]To indicate synergy the amount retained in salt minus fresh water was added to the amount retained in fresh water plus CDG (minus the amount retained in fresh water alone). This value was compared to the experimental salt plus CDG (minus fresh water). If this value exceeded the predicted then synergy was observed.
Shale sized between 6-10 mesh was hot rolled in the test solution at 150° F. for the indicated amount of time. The shale/test solution suspension was then screened over 10, 30 and 80 mesh screen, dried and weighed. The data is expressed as percent retained of the original weight (2.5 gm).

Fluid loss was shown by examining two simple systems. One of the systems contained bentonite and water (Table 3). The second system contained bentonite and a carboxymethylcellulose fluid loss additive (Table 4). The results clearly show that the addition of PECP or glycerol enhanced the effectiveness of these systems to reduce fluid loss. However, PECP is significantly better than glycerol or POLS for inhibiting fluid loss.

In Table 5 data are shown that demonstrate that PECP is an effective inhibitor of cuttings dispersion. On a percentage basis PECP is clearly more effective than glycerol at very low concentrations. In Table 6 data are shown to demonstrate that PECP acts synergistically with NaCl to inhibit cuttings dispersion. This observation was unexpected and provides a means by which improved solids control and borehole stability can be realized.

In Table 7 data are shown that PECP can be mixed into a polymeric or bentonitic based mud system. The results indicate that properties which are reasonable for field operations can be formulated in the laboratory using PECP. The significant improvement in fluid loss control is evident when PECP is added to the formulation.

TABLE 3

Effectiveness of Polyalcohols to Reduce Fluid Loss

| Percent by Volume | Alcohol (%) v/v | | | | | | Alcohol (%) v/v | | | | |
|---|---|---|---|---|---|---|---|---|---|---|---|
| Bentonite lb/bbl | 0 | 3 | 5 | 10 | 20 | 40 | 0 | 3 | 5 | 10 | 20 |
| | API Fluid Loss (ml) | | | | | | API Fluid Loss (ml) | | | | |
| | Glycerol | | | | | | PECP | | | | |
| 2 | 56.5 | 52.6 | 51.5 | 48.0 | 37.5 | 29.5 | 56.0 | 22.5 | 11.2 | 8.0 | 5.5 |
| 5 | 41.5 | 40.5 | 38.5 | 35.0 | 28.0 | 23.5 | 41.5 | 17.0 | 5.5 | 4.0 | 3.0 |
| 10 | 29.0 | 27.5 | 25.5 | 23.5 | 21.5 | 19.0 | 33.5 | 17.0 | 9.0 | 5.0 | 3.5 |
| | POLS | | | | | | W 80 | | | | |
| 2 | 57.0 | 48.5 | 40.5 | 30.5 | 25.3 | | 56.5 | 62.0 | 66.0 | 68.5 | — |
| 5 | 42.0 | 36.5 | 33.2 | 27.5 | 22.1 | | 41.0 | 51.1 | 55.7 | 54.9 | 58.0 |
| 10 | 31.5 | 23.5 | 20.2 | 15.6 | 12.8 | | 31.5 | 40.2 | 45.3 | 41.2 | — |

PECP 63% active
POLS 88% active
W 80 80% active (trademark for polyglycerol from Dow Chemical Company)

TABLE 4

Effectiveness of Alcohols on Fluid Loss With Carboxymethylcellulose
API Fluid Loss (ml)

| CMC lb/bbl | CMC | Glycerol 5% | PECP 5% | W 80 5% | POLS 5% | 5% Glycerol + CMC | 5% PECP + CMC | 5% POLS + CMC | 5% W 80 + CMC |
|---|---|---|---|---|---|---|---|---|---|
| — | 42.0 | 37.5 | 5.50 | 50.5 | 33.5 | — | — | — | — |
| 0.125 | 33.5 | 38.0 | 6.00 | 52.5 | 32.5 | 29.7 | 4.5 | 37.0 | 33.8 |
| 0.375 | 24.5 | 38.0 | 6.00 | 53.6 | 33.0 | 19.5 | 3.5 | 27.5 | 25.6 |
| 0.500 | 20.5 | 37.5 | 5.50 | 54.5 | 33.5 | 15.5 | 2.0 | 22.1 | 21.0 |
| Average | | 27.7 | 5.75 | 52.7 | 33.1 | — | — | — | — |
| CMC | | Glycerol | PECP | W 80 | POLS | 10% Glycerol + | 10% PECP + | 10% POLS + | 10% W 80 + |

TABLE 4-continued

Effectiveness of Alcohols on Fluid Loss With Carboxymethylcellulose
API Fluid Loss (ml)

| lb/bbl | CMC | 10% | 10% | 10% | 10% | CMC | CMC | CMC | CMC |
|---|---|---|---|---|---|---|---|---|---|
| — | 44.0 | 35.0 | 4.00 | 58.5 | 60.5 | — | — | — | — |
| 0.125 | 37.5 | 35.0 | 4.50 | 60.5 | 52.0 | 27.0 | 3.5 | 45.6 | 43.6 |
| 0.375 | 30.5 | 35.0 | 4.00 | 59.0 | 61.0 | 21.5 | 2.5 | 39.0 | 38.7 |
| 0.500 | 25.5 | 34.5 | 4.00 | 59.0 | 60.8 | 16.5 | 1.0 | 33.5 | 30.2 |
| Average | | 34.8 | 4.12 | 59.2 | 61.0 | — | — | — | — |

PECP 63% active
POLS 88% active
W 80 active (trademark for polyglycerols from Dow Chemical Company)
CMC is carboxymethycellulose

TABLE 5

Inhibition of Cutting Dispersion

Green Canyon 12,554 feet (Gulf of Mexico)

| Time (seconds) | 15 | 30 |
|---|---|---|
| Test Fluid | Percent Retained | |
| Fresh Water | 4.8 | 1.2 |
| Glycerol 2.5% | 7.6 | 1.2 |
| Glycerol 5% | 15.2 | 3.6 |
| Glycerol 10% | 18.8 | 4.4 |
| PECP 2.5% | 17.6 | 2 |
| PECP 5% | 31.6 | 6.8 |
| PECP 10% | 56.4 | 39.2 |
| 1,2-propanediol 2.5% | 8 | 2.2 |
| 1,2-propanediol 5% | 16.3 | 4.8 |
| 1,2-pronanediol 10% | 20.2 | 6.5 |
| POLS 2.5% | 8.9 | 1.5 |
| POLS 5% | 18.5 | 4 |
| POLS 10% | 23.5 | 3.5 |
| W 80 2.5% | 11.5 | 1.5 |
| W 80 5% | 25 | 4. |
| W 80 10% | 35.5 | 22.5 |
| CDG 2.5% | 14.6 | 1.6 |
| CDG 5% | 28.7 | 5 |
| CDG 10% | 45.6 | 28.7 |

PECP 63% active
POLS 88% active
W 80 100% active
CDG 67% active

TABLE 5-continued

Inhibition of Cutting Dispersion

Pierre (Utah)

| Time (Hours) | 10.5 | 18 |
|---|---|---|
| Test Fluid | Percent Retained | |
| Fresh Water | 10.4 | 7.8 |
| Glycerol 2.5% | 10.6 | 8.4 |
| Glycerol 5% | 11.2 | 10.6 |
| Glycerol 10% | 28.4 | 21.2 |
| PECP 2.5% | 39.6 | 35.2 |
| PECP 5% | 85.2 | 77.6 |
| PECP 10% | 87.2 | 82 |
| 1,2-propanediol 2.5% | 11.2 | 8.6 |
| 1,2-propanediol 5% | 12.5 | 9.6 |
| 1,2-pronanediol 10% | 30.5 | 25.3 |
| POLS 2.5% | 15.3 | 13.1 |
| POLS 5% | 17.9 | 18.5 |
| POLS 10% | 37 | 29.2 |
| W 80 2.5% | 25 | 17.9 |
| W 80 5% | 37.4 | 25.6 |
| W 80 10% | 42.3 | 37.6 |
| CDG 2.5% | 28.6 | 23.4 |
| CDG 5% | 52.5 | 32 |
| CDG 10% | 60.3 | 46.5 |

PECP 63% active
POLS 88% active
W 80 80% active
CDG 67% active

TABLE 6

Synergy Between PECP and NaCl

| | Experimental | Average for NaCl or Fresh Water | Prediction NaCl-FW + Alcohol-Fresh Water | Experimental Minus Fresh Water |
|---|---|---|---|---|
| | Percent Retained | | | |
| Green Canyon 12535 Shale (Gulf of Mexico) | | | | |
| 0.03 M NaCl | 21.6 | 21.1 | | |
| 0.03 M NaCl | 20.6 | | | |
| 0.178% PECP/0.03 M NaCl | 27.2 | | 8.8 | 15.45 |
| 0.357% PECP/0.03 M NaCl | 28.8 | | 10 | 17.05 |
| 0.714% PECP/0.03 M NaCl | 29.2 | | 14.4 | 17.45 |
| 1.43% PECP/0.03 M NaCl | 32 | | 18 | 20.25 |
| 2.86% PECP/0.03 M NaCl | 38.8 | | 19.6 | 27.05 |
| Fresh Water | 11.5 | 11.75 | | |
| Fresh Water | 12 | | | |
| 0.178% PECP/FW[1] | 11.2 | | | |
| 0.357% PECP/FW | 12.4 | | | |
| 0.714% PECP/FW | 16.8 | | | |
| 1.43% PECP/FW | 20.4 | | | |
| 2.86% PECP/FW | 22 | | | |
| Belridge 550 Shale | | | | |
| 0.03 M NaCl | 11.2 | 11.2 | | |
| 0.03 M NaCl | 11.2 | | | |
| 1.43% PECP/0.03 M NaCl | 25.6 | | 15.2 | 24.2 |
| 2.86% PECP/0.03 M NaCl | 40.4 | | 19.6 | 39.0 |
| Fresh Water | 1.2 | 1.4 | | |
| Fresh Water | 1.6 | | | |
| 1.43% PECP/FW | 6.8 | | | |

TABLE 6-continued

| Synergy Between PECP and NaCl | | | | |
|---|---|---|---|---|
| | Experimental | Average for NaCl or Fresh Water | Prediction NaCl-FW + Alcohol-Fresh Water | Experimental Minus Fresh Water |
| | | Percent Retained | | |
| 2.86% PECP/FW | 11.2 | | | |

[1]Fresh Water
Alcohol is expressed as percent by volume.
Sized shale cuttings (6–10 mesh) are rolled in the test fluid for 15 seconds at 150° F. The shale test solution mixture is then sized over 10, 30 and 80 mesh screens. The amount retained on the screens is added and the percent retained is calculated relative to the original starting material (2.5 gm).
To evaluate the synergistic effects, the percent shale retained in fresh water was subtracted from all of the other test solutions. The percent retained (minus percent retained in fresh water) in the sodium chloride solution was added to the percent retained (minus percent retained in fresh water) in the polyglycerol fresh water samples. This sum represented the predicted value if the effect of the two reagents was simply additive. If the experimental values (minus percent retained in fresh water) exceeded the predicted then synergy was supported.

TABLE 7

| | Laboratory Mud Formulations | | | | | |
|---|---|---|---|---|---|---|
| | Seawater/Bentonite Mud Formulation | | | Polymer Mud Formulation | | |
| Formulation | 1 | 2 | 3 | | 4 | 5 |
| Mud Weight (ppg) | 16 | 16 | 16 | Water (ml) | 284 | 226 |
| Seawater (ml) | 245 | 221 | 196 | XC[3] Polymer (gm) | 0.5 | 0.5 |
| PECP (% v/v of SW) | 0 | 13 | 26 | CMC[4] low viscosity (gm) | 1 | 0.5 |
| Bentonite (gm) | 10 | 10 | 10 | Starch (gm) | 4 | 4 |
| Drill solids (gm) | 35 | 35 | 35 | PHPA[5] (gm) | 0.25 | 0.25 |
| Barite (gm) | 367 | 360 | 354 | NaCl (gm) | 71 | 56 |
| Chrome Lignosulfonate (gm) | 6 | 6 | 6 | PECP (gm) | 0 | 23 |
| CMC[4] (gm) | 1 | 1 | 1 | Barite (gm) | 277 | 264 |
| Resinex[6] (gm) | 2 | 2 | 2 | Density | 14 | 14 |
| Density (ppg) | 16 | 16 | 16 | | | |
| 600 RPM | 71 | 80 | 85 | 600 RPM | 62 | 95 |
| 300 RPM | 41 | 46 | 50 | 300 RPM | 39 | 62 |
| PV[1] (cps) | 30 | 34 | 35 | PV[1] (cps) | 23 | 33 |
| YP[2] (lb/100 Ft[2]) | 11 | 12 | 15 | YP[2] (lb/100 Ft[2]) | 16 | 28 |
| 10 second gel | 3 | 4 | 5 | 10 second gel | 4 | 5 |
| 10 minute gel | 13 | 14 | 16 | 10 minute gel | 11 | 9 |
| API Fluid Loss (ml) | 11.5 | 5.5 | 2 | API Fluid Loss(ml) | 13.5 | 2 |
| Cake Thickness (32nd in) | 4 | 2 | 2 | Cake Thickness (32nd in) | 5 | 2 |
| HPHT (ml) 200° F. | 26.5 | 12.5 | 9.5 | HPHT (ml) 200° F. | 22.3 | 13.5 |
| Cake Thickness (32nd in) | 8 | 3 | 2 | Cake Thickness (32nd in) | 8 | 3 |

[1]Plastic Viscosity
[2]Yield Point
[3]XC is a water soluble polymer including polysaccharides, as sold under the trade name "Kelzan XC" by Kelco Corp.
[4]Carboxymethyl cellulose
[5]PHPA refers to partially hydrolyzed polyacrylamide. Muds were mixed and hot rolled for 16 hours. Rheologies were determined at 120° F. Rheologies were done with a Fann-35. The API and HPHT (high pressure-high temperature) fluid loss were done as described in the Standard Procedures of Field Testing Drilling Fluid (RP 13B).
[6]Water soluable, heat stable, synthetically formulated resin used for high temperature fluid loss sold under the trade name Resinex by MI Drilling Fluids Company.

In Table 8 results are shown to indicate that CDG does reduce the freezing point of fresh water or salt water solution. This indicates that CDG would be an effective inhibitor of gas hydrates. In Table 9 the the freezing point depression data for PECP indicate that PECP would be an effective inhibitor of gas hydrates.

TABLE 8

| Freezing Point Depression Data for CDG | | |
|---|---|---|
| Percent of CDG Solution | Brand Fluid | Laboratory Temperature (F.) |
| 0% | Fresh Water | 32 |
| 15% | Fresh Water | 28 |

TABLE 8-continued

| Freezing Point Depression Data for CDG | | |
|---|---|---|
| Percent of CDG Solution | Brand Fluid | Laboratory Temperature (F.) |
| 30% | Fresh Water | 23 |
| 60% | Fresh Water | 22 |
| 0% | 2.5% NaCl | 30.5 |
| 15% | 2.5% NaCl | 22 |
| 30% | 2.5% NaCl | 7 |
| 60% | 2.5% NaCl | 8 |

CDG (cyclic dimers of glycerol) 40% active concentration was mixed with either fresh water or 2.5% NaCl by weight.
Freezing point depression was done by the ASTM-D1177 method.

TABLE 9

Freezing Point Depression Data for PECP

| Solution Concentration % w | Active Alcohol Concentration | | | Freezing Point Data | | | | | |
|---|---|---|---|---|---|---|---|---|---|
| | | | | Experimental Data | | | Curve Fit Data | | |
| | PECP % w | Glycerol % w | POLS °F. | PECP °F. | Glycerol °F. | POLS °F. | PECP °F. | Glycerol °F. | POLS °F. |
| 0 | 0 | 0 | .0 | 32.0 | 32.0 | 32.0 | 30.90 | 32.8 | 33.0 |
| 10 | 6.30 | 0 | 8.8 | 30.0 | 27.5 | 29.35 | 29.40 | 27.9 | 29.2 |
| 15 | 9.45 | 15.0 | 13.2 | 29.0 | 24.5 | 27.50 | 27.40 | 24.8 | 26.6 |
| 20 | 12.60 | 20.0 | 17.6 | 27.5 | 23.0 | 26.00 | 24.60 | 21.3 | 23.5 |
| 30 | 18.90 | 30.0 | 26.4 | 26.0 | 14.0 | 21.90 | 16.30 | 12.9 | 16.1 |
| 40 | 25.20 | 40.0 | 35.2 | 20.0 | 5.0 | 14.90 | 4.70 | 2.8 | 7.0 |
| 50 | 31.50 | 50.0 | 44.0 | 14.0 | −14.5 | −6.50 | −10.40 | −9.0 | −4.0 |
| 60 | 37.80 | 60.0 | 52.8 | 8.5 | −26.0 | — | −28.80 | −22.5 | −16.8 |
| 65 | 40.95 | 65.0 | 57.2 | 5.5 | −25.5 | −9.50 | −39.30 | −29.9 | −23.8 |
| 80 | 50.40 | 80.0 | 70.4 | −12.5 | — | — | — | — | — |

Freezing Point Depression for alcohols in fresh water was done by ASTM D-1177 method.
Percent alcohol is expressed as percent by weight.
Equations:
Freezing Point, (°F.) = 30.902 + 0.22099 × Percent PECP −0.01695 × Percent PECP 2
Freezing Point, (°F.) = 32.761 − 0.4014 × Percent Glycerol −0.008666 × Percent Glycerol 2
Freezing Point, (°F.) = 32.991 − 0.2936 × Percent POLS −0.008935 × Percent POLS 2

The foregoing description of the invention is merely intended to be explanatory thereof, and various changes in the details of the described method and apparatus may be made within the scope of the appended claims without departing from the spirit of the invention.

What is claimed is:

1. A water base drilling fluid having an additive comprising polycyclicpolyetherpolyol having a molecular weight $M_w$ in excess of 50,000.

2. The drilling fluid of claim 1 wherein the polycyclicpolyetherpolyol is further characterized by bimodal molecular weight distribution.

3. The drilling fluid of claim 1 including from about 1 to 26 weight percent of a salt selected from the group consisting of NaCl, NaBr, KCl, $CaCl_2$ and $NaNO_3$.

* * * * *